W. GUTHRIE.
MOTOR TRACTOR FOR AGRICULTURAL WORK.
APPLICATION FILED APR. 7, 1920.
1,392,149.
Patented Sept. 27, 1921.
5 SHEETS—SHEET 1.
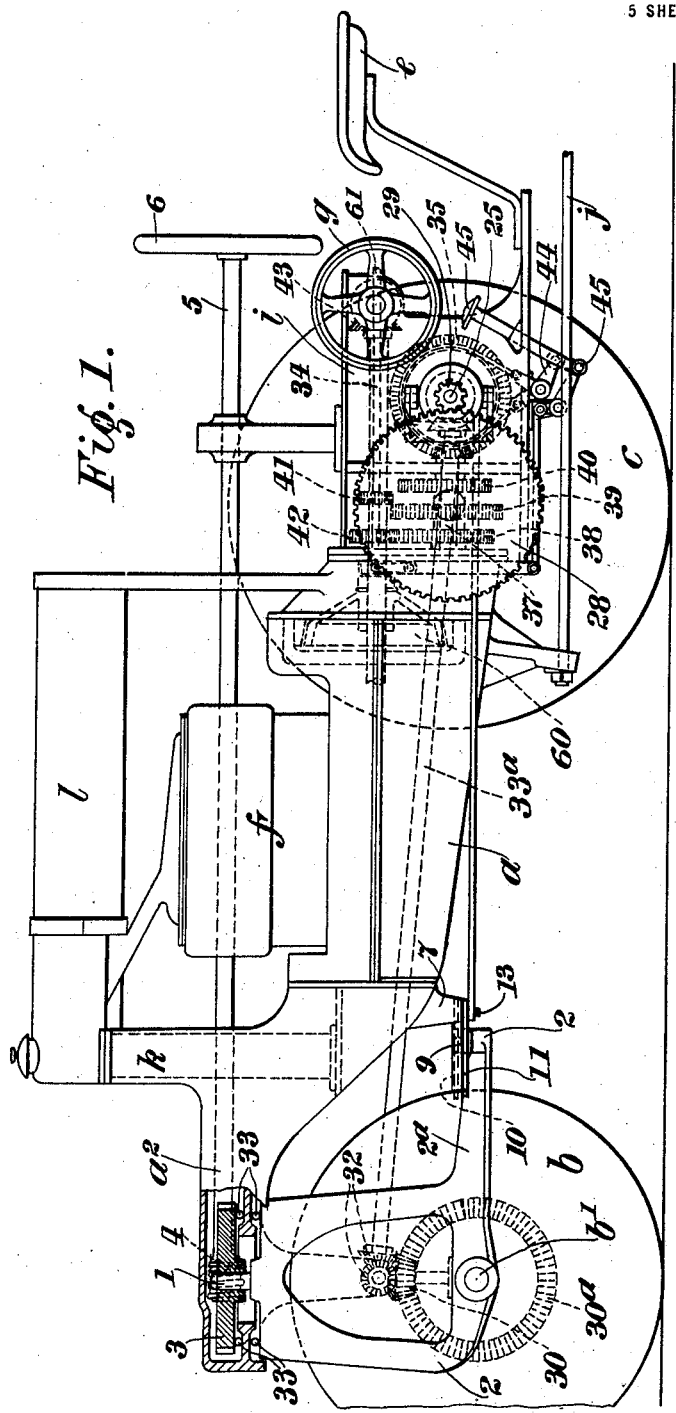

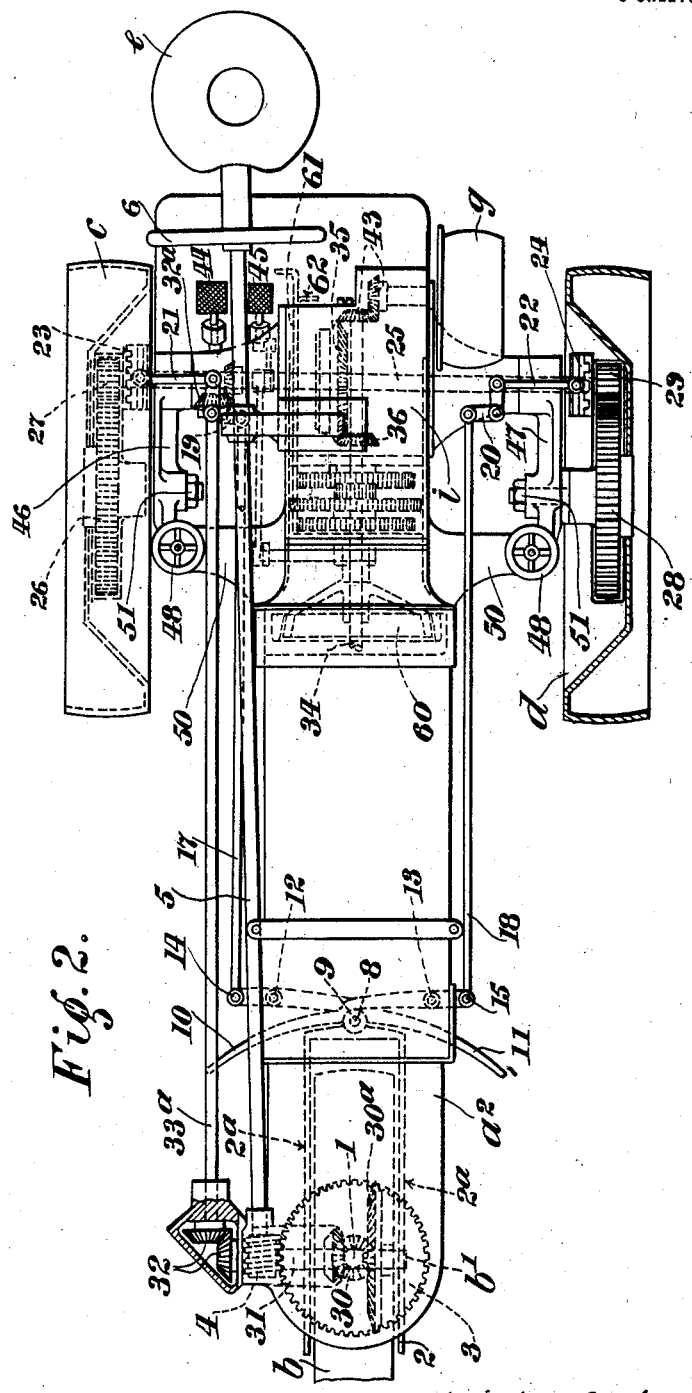

W. GUTHRIE.
MOTOR TRACTOR FOR AGRICULTURAL WORK.
APPLICATION FILED APR. 7, 1920.
1,392,149.
Patented Sept. 27, 1921.
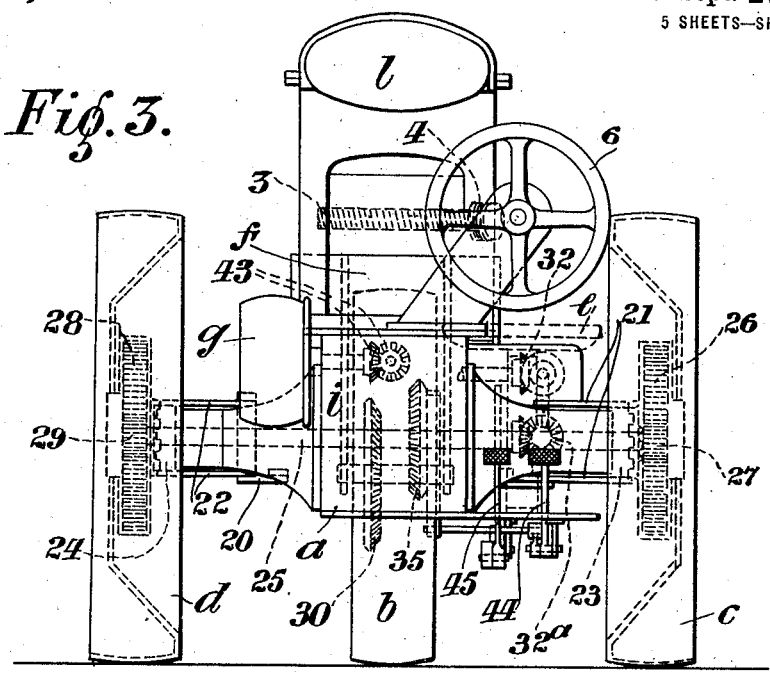
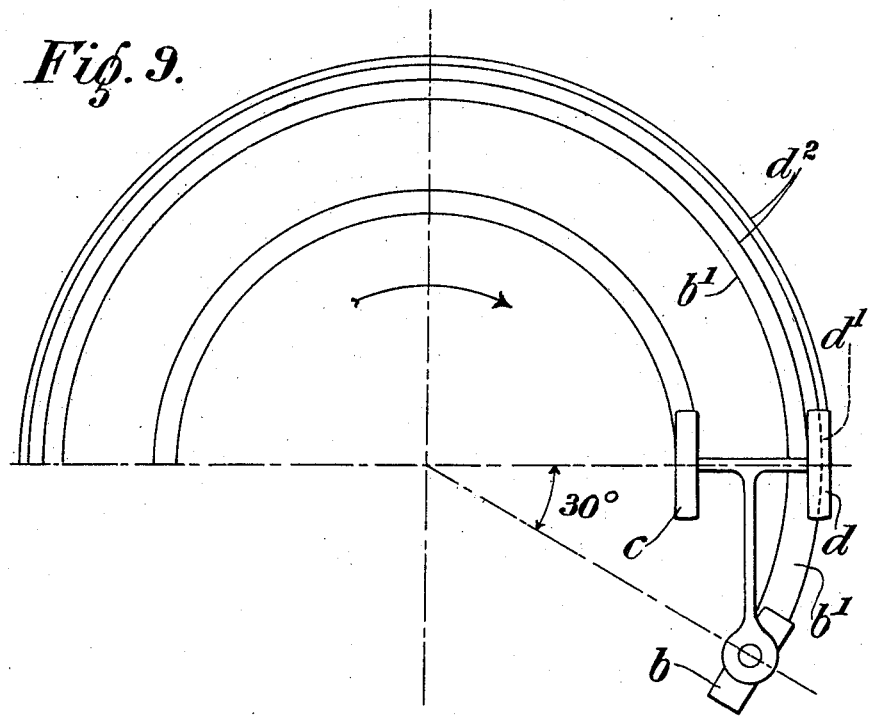

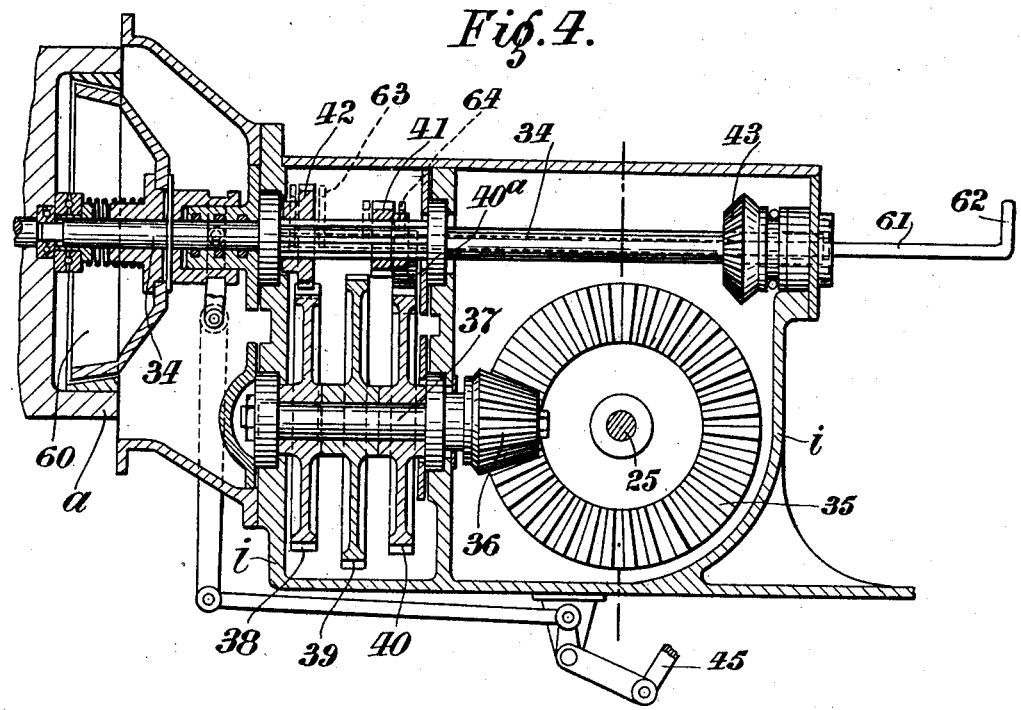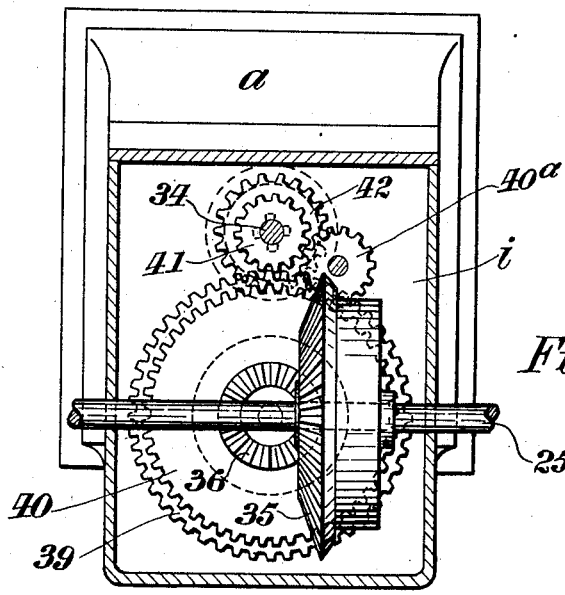

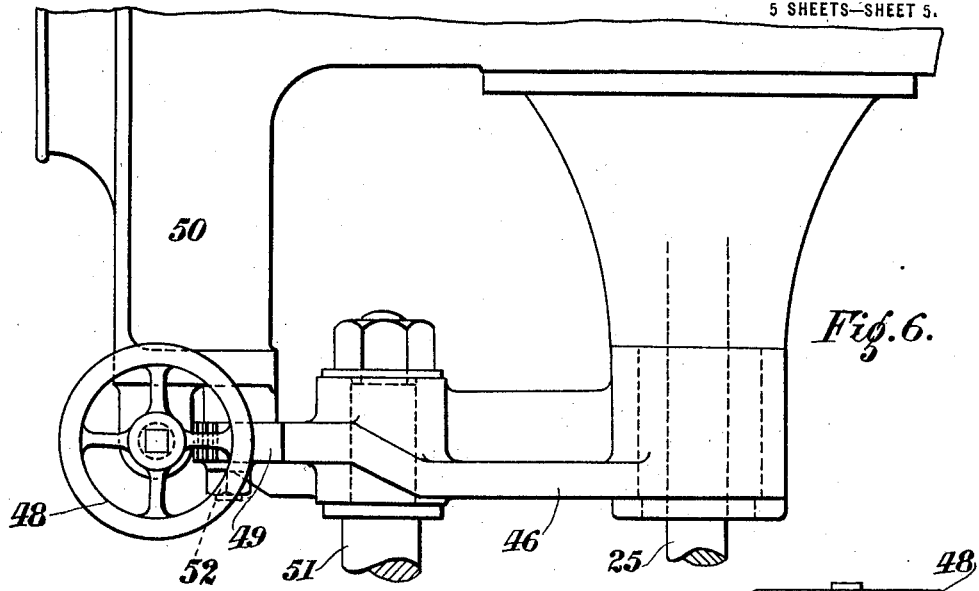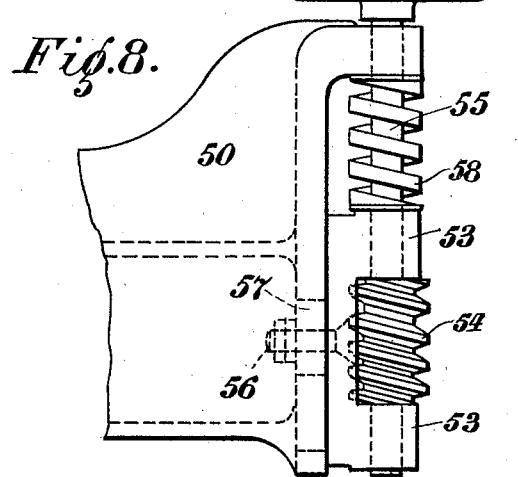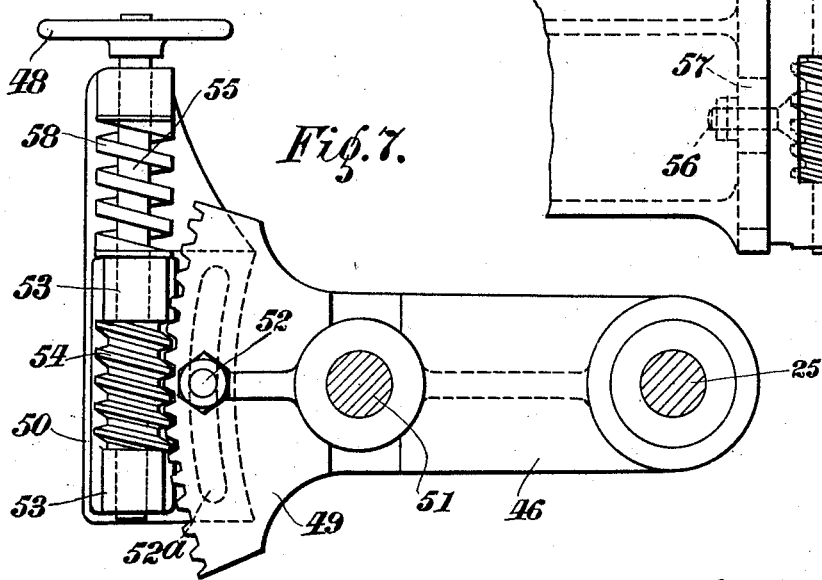

UNITED STATES PATENT OFFICE.

WILLIAM GUTHRIE, OF MOTHERWELL, SCOTLAND, ASSIGNOR OF ONE-HALF TO DUNCAN McNAUGHTON WALLACE, OF GLASGOW, SCOTLAND.

MOTOR-TRACTOR FOR AGRICULTURAL WORK.

1,392,149. Specification of Letters Patent. Patented Sept. 27, 1921.

Application filed April 7, 1920. Serial No. 371,875.

*To all whom it may concern:*

Be it known that I, WILLIAM GUTHRIE, of Glencroft, Motherwell, Lanarkshire, Scotland, a subject of the King of Great Britain, have invented certain new and useful Improvements in Motor-Tractors for Agricultural Work, of which the following is a specification.

This invention relates to motor tractors for agricultural and other work of the class having three co-acting driving wheels, a single front wheel and two back wheels, the front wheel being a combined driving and steering wheel and the back wheels being both driving wheels.

Under this invention I provide a tractor of this class, in which the wheels are so operatively connected that all three co-act to drive the machine when going straight forward while, when the machine is turning, say at headlands when plowing, one of the back wheels co-acts with the front wheel in driving the machine the other back wheel being allowed to run free. The means whereby one or other of the back wheels is left to run free, when turning the tractor, preferably consists of a clutching and declutching arrangement operated automatically through the steering of the machine by the front wheel.

Preferably the wheels are so disposed relatively to one another and the clutching and declutching arrangement is also such that, when turning at headlands, the front wheel and that back wheel, which, for the time being, is the outer one will run in the same track, or substantially the same track, both these wheels then acting as driving wheels while the inner back wheel will run freely on its axle.

The drive from the motor to the three wheels may be taken through a suitable change speed and reverse gear so constructed and arranged that, when the tractor is reversed and moves straight backward all three wheels will co-act and drive together.

In order that the invention may be clearly understood I have hereunto appended explanatory drawings whereon I have shown, by way of example, an embodiment of the invention.

Figure 1 is a side elevation of the tractor the back wheel $d$ being removed but the gear 28, 29 shown.

Fig. 2 is a corresponding plan but with the wheel $d$ sectioned so as to show the gear 28, 29, and with radiator and fuel tank omitted.

Fig. 3 is a rear end elevation with the seat $e$ removed.

Figs. 4 and 5 are views of the main driving gear drawn to an enlarged scale.

Fig. 6 is a plan, Fig. 7 a corresponding side view, and Fig. 8 a view of the bracket 50.

Fig. 9 is a diagram.

On the drawings the same reference letters and numerals wherever repeated indicate the same or similar parts.

$a$ is the frame of the tractor, $b$ the front wheel and $c$ and $d$ the back wheels. $e$ is the driver's seat, $f$ the motor and $g$ the usual belt pulley. $j$ is the draw bar. $k$ is the radiator and $l$ the fuel tank. Only such parts of the tractor will be hereinafter fully described as may be found necessary to clearly understand the invention.

As will be seen, in my improved tractor, the front driving and steering wheel $b$ has its axle $b^1$ carried in a forked frame 2 pivoted, at 1, in the forward extension $a^2$ of the main frame $a$. The pivot 1 forms the steering pillar and is operable by a worm wheel 3, keyed thereon, the worm wheel being rotated by a worm 4 on a steering shaft 5 having a steering wheel 6. It is obvious, by turning the wheel 6, in either direction, the worm gear will turn the pivot and move the steering fork 2 and the wheel $b$ so as to steer the tractor as desired. The fork 2 has a rearward extension $2^a$ provided with a pin 8 with roller 9 thereon, this roller bearing against superposed levers 10, 11, these levers being curved, as shown, and fulcrumed on pins 12, 13, to projections 7 on the frame. The levers are jointed at 14, 15, to pull rods 17, 18, which operate bell cranks 19, 20, and clutch forks 21, 22, adapted to operate the clutches 23, 24, on the rear driving shaft 25. 26, 27, 28, 29, are spur and pinion gears for driving the two back wheels from shaft 25. It is obvious with this arrangement that, as the front wheel is steered and moves from side to side, the roller 9 will act on one or other of the levers 10, 11, and cause same to operate one or other of the pull rods 17, 18, thereby throwing one or other of the clutches 23, 24, out of gear and consequently declutching one or other of the back driving wheels $c, d$. It is equally obvious, owing to the arcuate formation of the levers 10, 11, that when one of the clutches is moved out of gear by the turning of the front wheel it will be retained out of gear until the wheel is moved back again to the mid position. The clutches are, in known manner, normally retained in gear by spring action, the springs not being shown. The springs may be arranged in connection with the pull rods 17, 18.

The front wheel is driven by bevel gear 30, $30^a$, from a cross shaft 31 which, in its turn, is driven by the bevel gear 32 from the shaft $33^a$ driven by bevel gear $32^a$ from the shaft 25.

To steady the front fork 2 the upper end thereof and the wheel 3 work on the ball bearings 33.

The shaft 25 may be driven from the motor shaft 34 in any suitable and well known manner. In Figs. 4 and 5 a drive is shown consisting of the bevel gear 35, 36, counter shaft 37, two speed gears 38, 39, reversing gear 40, idler $40^a$, sliding pinion 41 and driving pinion 42. 43 is the gear for driving the pulley $g$. The whole gear is inclosed in the gear box $i$ secured to and forming part of the tractor frame.

44 (see Figs. 1, 2 and 3) is the pedal for operating the brake on wheel 35 and 45 the pedal for operating the friction driving clutch 60.

In the arrangement shown, when the pedal 45 is operated the friction clutch 60 is disengaged. The pinions 41, 42, can be moved into gear by means of an ordinary arrangement of "gate" change gear (not shown) operated by a rod 61 with handle 62. By moving the fork 63 the driving pinion 42 can be put in gear (as shown Fig. 4) with the wheel 38 and drives the shaft 37, pinion 36, bevel wheel 35 and shaft 25 and by means of the clutches 23, 24, (which are then engaged) the two back wheels $c$, $d$, and by means of the gears $32^a$, 32, 30, $30^a$, and shafts $33^a$, 31, also the front wheel $b$, the three wheels co-acting together to drive the tractor so that the maximum tractive effort is obtained. When desired, by throwing out the pinion 42 (by fork 63) and moving by means of the fork 64 the sliding pinion 41 into gear with 39 the second gear can be put in operation so as to drive the tractor at a reduced speed; or, by again shifting the pinion 41 the idler $40^a$ and reverse gear 40 can be put in operation so as to reverse (if the machine is traveling on the straight) all three wheels simultaneously and cause them to co-act in driving the machine backward.

When the machine is turning at headlands the outside back wheel (marked $d$ in diagram Fig. 9, which see) has its tread $d^1$ running in the track $b^1$ of the broad front wheel $b$. $d^2$ is the track of the wheel $d$ and as will be seen it is partly within the track $b^1$ of the wheel $b$. The wheels $b$, $d$, co-act together, when turning, the wheels being geared together so as to run at the same linear velocity and, owing to the fact that they run in co-incident or substantially co-incident tracks, no slip will occur, and no differential gear is required between them. The inside wheel $c$ runs at a lower speed than the wheel $d$ and is declutched by the action of the front wheel $b$ on the lever 11 (Fig. 2). If the curve is in opposite direction then the wheels $b$, $c$, will co-act together in driving the machine and run on co-incident or substantially co-incident tracks while the wheel $d$ will be declutched by the action of lever 10. For a turning arc, such as shown at Fig. 9, the pivot of the front wheel $b$ would be located in the machine frame, in relation to the axis of rotation of the back wheels at an angle of 30° as shown.

It is important to note from Fig. 9 that no differential gear can be fitted between the wheels $c$ and $d$ as the slower movement of the wheel $c$ would influence the wheel $d$ to over-run the wheel $b$.

The axles 51 of the back wheels $c$, $d$, are mounted on radial arms 46, 47, swinging on the back shaft 25. One of these arms is shown to an enlarged scale at Figs. 6 and 7. As will be seen the arm 46 has a toothed sector 49 with locking bolt 52 which works in a slot $52^a$ in the frame part 50. In the frame part 50 is a sliding block 53 carrying a worm 54 keyed on a spindle 55 having a hand wheel 48. The block 53 has a bolt 56 (in Fig. 8) working in a slot 57 in the frame. 58 is a cushioning spring on the spindle 55.

The arrangement is similar for both wheels $c$, $d$.

The springs 55 take up shocks and jars transmitted by the wheels $c, d$. It is obvious by turning the hand wheels 48 and worms 54 the wheels $c$, $d$, can be adjusted to suit the land and furrow when the tractor is engaged in plowing. The plow would be attached to the draw bar $j$.

Having now fully described my invention what I claim and desire to secure by Letters Patent is:—

1. A tractor for agricultural and other work having two rear driving wheels and a combined driving and steering wheel intermediately disposed in front of the two rear wheels, means whereby all three wheels are positively driven in conjunction when the tractor is traveling straight forward and means whereby the front wheel and one of the rear wheels work together when the tractor is turning while the other back wheel runs free.

2. A tractor for agricultural and other work having two rear driving wheels and a combined driving and steering wheel intermediately disposed in front of the two rear wheels, means whereby all three wheels are positively driven in conjunction when the tractor is traveling straight forward and means whereby the front wheel and one of the rear wheels work together when the tractor is turning while the other back wheel revolves freely on its axle.

3. A tractor for agricultural and other work having two rear driving wheels and a combined driving and steering wheel intermediately disposed in front of the two rear wheels, means whereby all three wheels are positively driven in conjunction when the tractor is traveling straight forward and means whereby the front wheel and that rear wheel which is the outer one work together when the tractor is turning while the other back wheel runs free.

4. A tractor for agricultural and other work having two rear driving wheels and a combined driving and steering wheel intermediately disposed in front of the two rear wheels, means whereby all three wheels are positively driven in conjunction when the tractor is traveling straight forward and means controlled by the movements of the front wheel whereby the front wheel and one of the rear wheels work together when the tractor is turning, while the other back wheel runs free.

5. A tractor for agricultural and other work having two rear driving wheels and a combined driving and steering wheel intermediately disposed in front of the two rear wheels, means whereby all three wheels are positively driven in conjunction when the tractor is traveling straight forward and automatically acting means causing one of the rear wheels to run freely on its axle when the tractor is turning to the left or right.

6. A tractor for agricultural and other work having two rear driving wheels and a combined driving and steering wheel intermediately disposed in front of the two rear wheels, means whereby all three wheels are positively driven in conjunction when the tractor is traveling straight forward, clutch gear for each rear wheel and automatically acting means causing one or other of the back wheels to be declutched when the tractor is turning to left or right.

7. A tractor for agricultural and other work having two rear driving wheels and a combined driving and steering wheel intermediately disposed in front of the two rear wheels and means whereby all three wheels are caused to coöperate together in driving the tractor when going straight forward and two only of the wheels to coöperate when the tractor is traversing a curve.

8. A tractor for agricultural and other work having two rear driving wheels and a combined driving and steering wheel intermediately disposed in front of the two rear wheels and means whereby all three wheels are caused to coöperate together in driving the tractor when going straight forward and two only of the wheels to coöperate when the tractor is traversing a curve these two wheels traveling in the same or substantially the same track.

9. A tractor for agricultural and other work having two rear driving wheels and a combined driving and steering wheel intermediately disposed in front of the two rear wheels and means whereby all three wheels are caused to coöperate together in driving the tractor when going straight forward or reversing straight backward and two only of the wheels to coöperate when the tractor is traversing a curve when going either backward or forward.

10. A tractor for agricultural and other work having two rear driving wheels and a combined driving and steering wheel intermediately disposed in front of the two rear wheels and means whereby all three wheels are caused to coöperate together in driving the tractor when going straight forward and the front wheel and one back wheel coöperate when the tractor is traversing a curve.

11. A tractor for agricultural and other work having two rear driving wheels and a combined driving and steering wheel intermediately disposed in front of the two rear wheels and means whereby all three wheels are caused to coöperate together in driving the tractor when going straight forward and the front wheel and one back wheel coöperate when the tractor is traversing a curve the other back wheel being freed.

12. A tractor for agricultural and other work having two rear driving wheels and a combined driving and steering wheel intermediately disposed in front of the two rear wheels, means whereby all three wheels are caused to coöperate together in driving the tractor when going straight forward and two only of the wheels to coöperate when the tractor is traversing a curve and means for adjusting the rear wheels relatively to one another.

In testimony whereof I affix my signature in presence of two witnesses.

WM. GUTHRIE.

Witnesses:
MARY GREEN,
KATE WALKER.